(12) United States Patent
Nagai et al.

(10) Patent No.: US 7,583,009 B2
(45) Date of Patent: Sep. 1, 2009

(54) ACTUATOR

(75) Inventors: Nobuyuki Nagai, Miyagi (JP); Go Sudo, Kanagawa (JP); Koichi Tanaka, Kanagawa (JP); Yasuhiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 11/557,366

(22) Filed: Nov. 7, 2006

(65) Prior Publication Data

US 2007/0114116 A1 May 24, 2007

(30) Foreign Application Priority Data

Nov. 18, 2005 (JP) ............................... 2005-334050

(51) Int. Cl.
*H01L 41/08* (2006.01)
(52) U.S. Cl. ..................................... 310/328; 310/800
(58) Field of Classification Search .................. 310/800, 310/330–332, 365, 328
See application file for complete search history.

(56) References Cited

U.S. PATENT DOCUMENTS

| 6,911,764 | B2 * | 6/2005 | Pelrine et al. ............... 310/328 |
| 7,166,953 | B2 * | 1/2007 | Heim et al. .................. 310/333 |
| 2005/0122007 | A1 * | 6/2005 | Ishibashi et al. ............ 310/800 |
| 2006/0076540 | A1 * | 4/2006 | Zama et al. ................. 252/500 |
| 2007/0184238 | A1 * | 8/2007 | Hockaday et al. ............. 428/98 |

FOREIGN PATENT DOCUMENTS

JP  11-206162  7/1999

* cited by examiner

*Primary Examiner*—Jaydi SanMartin
(74) *Attorney, Agent, or Firm*—K&L Gates LLP

(57) ABSTRACT

An actuator is provided. The actuator includes a pair of electrode layers, and an ionically conductive polymer layer arranged between the pair of electrode layers. The ionically conductive polymer layer is configured to bend or deform as a result of the application of a voltage between the pair of electrode layers. The electrode layers each include carbon particles and an ionically conductive resin, and the ionically conductive resin binds the carbon particles with each other.

7 Claims, 4 Drawing Sheets

FIG.2A  FIG.2B  FIG.2C
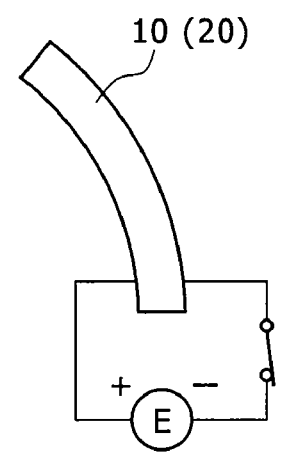
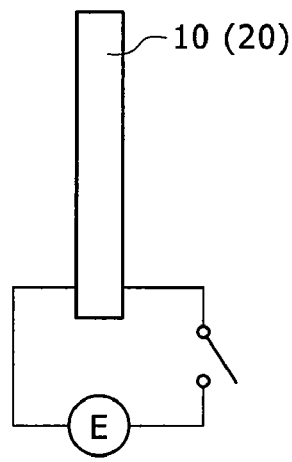
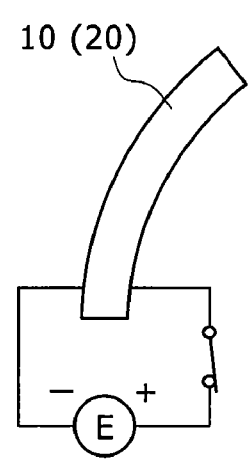
FIG.3
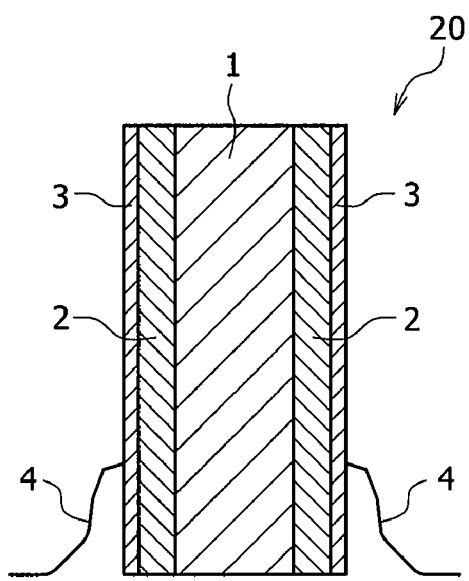

ACTUATOR

CROSS REFERENCE TO RELATED APPLICATIONS

The present application claims priority to Japanese Patent Application JP 2005-334050 filed in the Japanese Patent Office on Nov. 18, 2005, the entire contents of which is being incorporated herein by reference.

BACKGROUND

The present application relates to polymer actuators, which function as actuators by bending or deforming their ionically conductive polymer layers.

Demands have been made on compact, lightweight, and flexible actuators in fields including medical devices, industrial robots, and micromachines. Actuators operating according to various principles have been proposed to meet these demands. Such actuators operate by the actions of, for example, electrostatic attraction, piezoelectricity, ultrasound, shape-memory effects of shape-memory alloys, and expansion/contraction of polymers.

Polymer actuators using ionically conductive polymers are categorized as actuators operating by the action of expansion/contraction of polymers. The polymer actuators have been expected as novel actuators, because they are lightweight and can deliver large force. These polymer actuators each include an ionically conductive polymer layer (ion-exchange resin membrane) and a pair of metal electrodes sandwiching the ionically conductive polymer layer. The pair of metal electrodes are insulated from each other. The ionically conductive polymer layer bends or deforms by incorporating water into the ionically conductive polymer layer and applying a voltage between the metal electrodes. The properties of actuators of this mechanism, such as deformation magnitude and delivered force, vary depending typically on materials and structure of the electrodes.

As possible solutions to these problems, Japanese Patent No. 2961125 and Japanese Unexamined Patent Application Publication (JP-A) No. 11-206162 propose actuators that may have an increased deformation magnitude and may deliver greater force. These actuators have electrodes having large specific surface areas at the interfaces with an ionically conductive polymer. The electrodes are formed by a plating technique, in which an ionically conductive polymer layer is allowed to adsorb a complex typically of gold or platinum, and the adsorbed complex is reduced using a reducing agent to deposit gold or platinum as the electrodes.

However, when films or membranes as electrodes are prepared from a noble metal by the plating technique, the film deposition rate is low, the resulting film shows a large variation, a special chemical should be used, and dedicated facilities should be used. Accordingly, it is difficult to produce actuators having stable performance at low cost in commercial production according to this technique.

SUMMARY

Under these circumstances, there is a need for a polymer actuator which has high deformation performance, which deformation performance can be easily and conveniently controlled with high reliability. It is desirable to prepare electrodes for use in such a polymer actuator according to an easy and convenient procedure at low cost.

According to an embodiment, there is provided a polymer actuator which includes a pair of electrode layers and an ionically conductive polymer layer arranged between the pair of electrode layers, which ionically conductive polymer layer is configured to bend or deform as a result of the application of a voltage between the pair of electrode layers, in which the electrode layers each include carbon particles and an ionically conductive resin, and the ionically conductive resin binds the carbon particles with each other.

The polymer actuator is inexpensive, because it has electrode layers including carbon particles and an ionically conductive resin. The polymer actuator may thereby exhibit target performance with good reproducibility. This is because the ionically conductive resin binds the carbon particles with each other in the electrode layers.

The polymer actuator preferably has deformation performance controlled by adjusting at least one selected from the specific surface area of the carbon particles, the weight ratio in solid content of the carbon particles to the ionically conductive resin, and the thicknesses of the electrode layers. These parameters may be easily and conveniently adjusted, and the polymer actuator may exhibit target performance reliably.

The electrode layers may each include a film of a coating composition applied to the ionically conductive polymer layer, which coating composition includes an ionically conductive resin component and carbon particles. The electrode layers may also be electroconductive films compressed and bound to the ionically conductive polymer layer, which electroconductive films may each include an ionically conductive resin and carbon particles. A polymer actuator having such electrode layers prepared by coating or compression bonding can be obtained with good reducibility.

The polymer actuator preferably further includes electroconductive metallic layers arranged on or above the electrode layers, respectively. The polymer actuator may thereby exhibit excellent deformation performance with further high reliability. The electroconductive metallic layers preferably contain at least one of gold and platinum.

The cationic substance may include at least one of a metal ion with water, an organic ion with water, and an ionic liquid. When the ionically conductive polymer layer is impregnated with an ionic liquid, the polymer actuator may be used even at elevated temperatures or in a vacuum while avoiding the risk of evaporation.

Additional features and advantages are described herein, and will be apparent from, the following Detailed Description and the figures.

BRIEF DESCRIPTION OF THE FIGURES

FIGS. 2A, 2B, and 2C illustrate the operating principle of a polymer actuator according to an embodiment.

FIG. 3 is a schematic cross-sectional view of a polymer actuator according to another embodiment.

DETAILED DESCRIPTION

The configurations of polymer actuators according to embodiments will be illustrated below.

Figure 1:
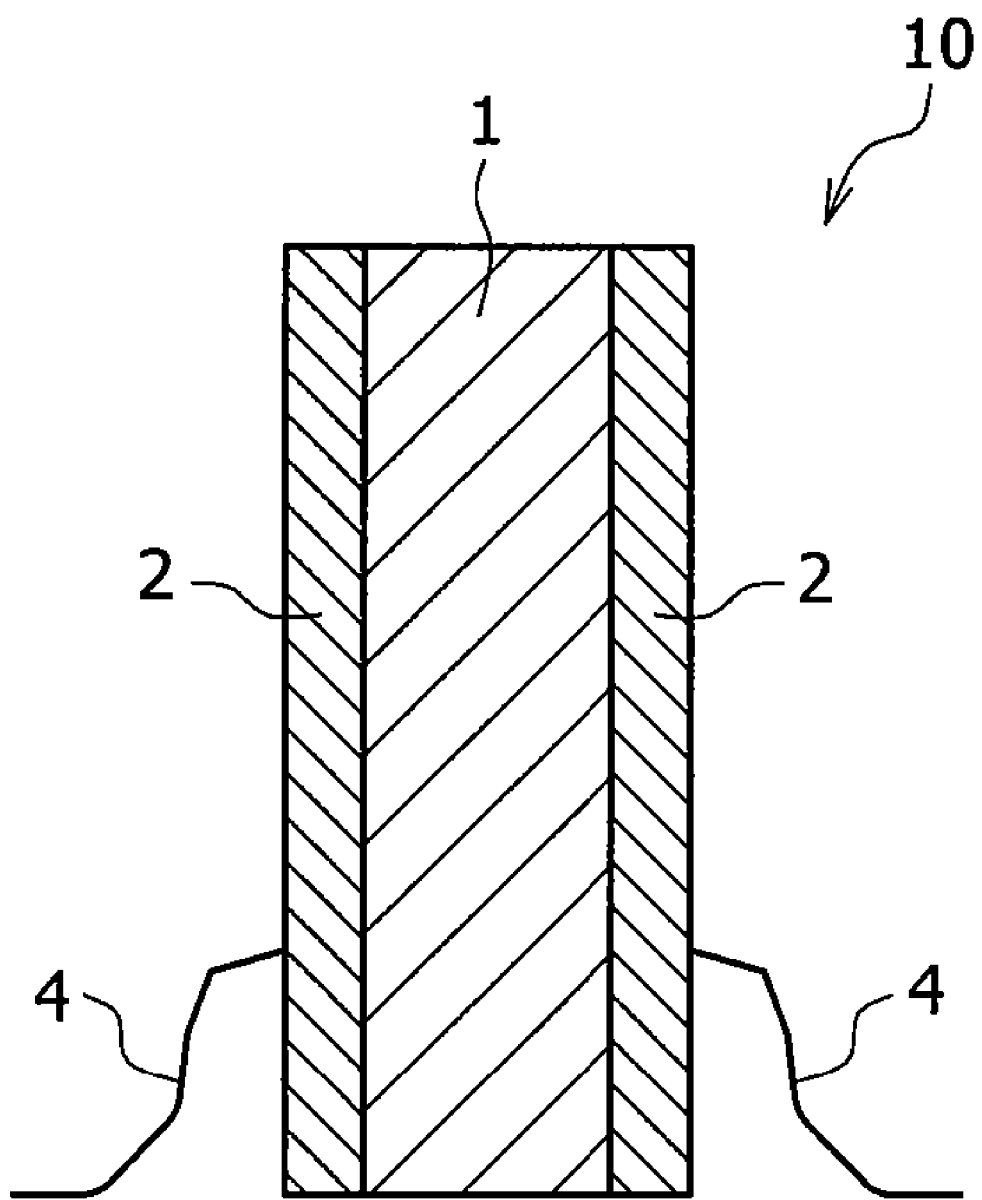
FIG. 1 is a schematic cross-sectional view of a polymer actuator according to an embodiment.

FIG. 1 is a schematic cross-sectional view of a polymer actuator according to an embodiment.

As shown in FIG. 1, the polymer actuator 10 includes an ionically conductive polymer layer (ionically conductive polymer film) 1, electrode layers 2, and a pair of lead wires 4. The ionically conductive polymer layer is impregnated with a cationic substance. The electrode layers 2 are arranged so as to sandwich the ionically conductive polymer layer 1. The pair of lead wires 4 are electrically connected to the electrode layers 2, respectively. The pair of lead wires 4 is configured to apply a voltage between the pair of electrode layers 2 so as to allow the ionically conductive polymer layer 1 to bend or deform.

The ionically conductive polymer layer 1 may include an ion-exchange resin typically containing a fluorocarbon resin or hydrocarbon resin as its skeleton. The polymer layer 1 may have front and back, two principal planes. The polymer layer 1 may be in the form of, for example, a strip, disc, solid column, or cylinder. The ion-exchange resin may be any of anion-exchange resins, cation-exchange resins, amphoteric ion-exchange resins, of which cation-exchange resins are preferred.

Experimental Examples of cation-exchange resins include polyethylenes, polystyrenes, and fluorocarbon resins, each of which is introduced with a functional group such as sulfonic group or carboxyl group. Among them, preferred are cation-exchange resins containing fluorocarbon resins introduced with a functional group such as sulfonic group or carboxyl group.

The electrode layers 2 include carbon particles and an ionically conductive resin, in which the ionically conductive resin binds the carbon particles with each other. The carbon particles may be fine particles of electroconductive carbon black. The carbon particles preferably have a large specific surface area. With an increasing specific surface area of the carbon particles, the ionically conductive polymer layer 1 has an increasing surface area in contact with the electrode layers 2 and thereby deforms to an increasing extent. For example, Ketjenblack is preferably used. The ionically conductive resin may contain the same material as that constituting the ionically conductive polymer layer 1.

The electrode layers 2 may be arranged by applying a coating composition to the ionically conductive polymer layer 1, which coating composition contains an ionically conductive resin component and carbon particles. The electrode layers 2 may also be arranged by subjecting electroconductive films to compression bonding with the ionically conductive polymer layer 1, which electroconductive films contain carbon particles and an ionically conductive resin.

By any of these procedures, the electrode layers 2 can be easily and conveniently arranged in a short time.

At least the ionically conductive polymer layer 1 is impregnated with a cationic substance. The cationic substance is preferably at least one selected from a metal ion with water, an organic ion with water, and an ionic liquid. The metal ion includes, for example, sodium ion, potassium ion, lithium ion, and magnesium ion. The organic ion can be, for example, alkyl ammonium ions. Such ions are present as hydrates in the ionically conductive polymer layer 1. The polymer actuator 10 is preferably sealed so as to prevent water therein from evaporation, when the ionically conductive polymer layer 1 contains water as a result of including a metal ion with water, or an organic ion with water.

The ionic liquid refers to a solvent containing an incombustible, nonvolatile ion alone. Such an ionic liquid is also called as an ambient temperature molten salt. Experimental Examples of ionic liquids are imidazolium ring-containing compounds, pyridinium ring-containing compounds, and aliphatic compounds. When the ionically conductive polymer layer 1 is impregnated with an ionic liquid, the polymer actuator 10 may be used even at elevated temperatures or in a vacuum while substantially avoiding the evaporation of a liquid inside the actuator.

FIGS. 2A, 2B, and 2C illustrate the operating principle of a polymer actuator 10 according to an embodiment. The illustration is made herein by taking an ionically conductive polymer layer 1 impregnated with sodium ion as an example.

As shown in FIG. 2A, an electric power supply E supplies, through lead wires 4, a positive potential to the left-hand electrode layer 2 and supplies a negative potential to the right-hand electrode layer 2 of the polymer actuator 10. By the action of the potential difference between the pair of electrode layers 2, a sodium ion hydrate in the ionically conductive polymer layer 1 is attracted by and moves toward the right-hand electrode layer 2 to which the negative potential is applied. Accordingly, the sodium ion hydrate is enriched in the vicinity of the right-hand electrode layer 2, and this region expands in volume. In contrast, the sodium ion hydrate reduces in concentration in the vicinity of the left-hand electrode layer 2 to which a positive potential is applied. This region thereby contracts or shrinks in volume. Accordingly, there occurs a difference in volume between the two regions of the ionically conductive polymer layer 1 in the vicinities of the two electrode layers 2, and the ionically conductive polymer layer 1 bends toward the left hand in FIG. 2A.

As shown in FIG. 2B, the electric power supply E does not supply a voltage, and the two electrode layers 2 have no potential difference between them. Accordingly, the two regions of the ionically conductive polymer layer 1 in the vicinities of the two electrode layers 2 has no difference in volume, and the ionically conductive polymer layer 1 stands straight without bending.

As shown in FIG. 2C, the electric power supply E supplies, through the lead wires 4, a negative potential to the left-hand electrode layer 2 and supplies a positive potential to the right-hand electrode layer 2 of the polymer actuator 10. The voltage applied in the case of FIG. 2C is the reverse of the stage of FIG. 2A. As a result of the potential difference in the polymer actuator 10, the ionically conductive polymer layer 1 expands in volume in the vicinity of the left-hand electrode layer 2 to which a negative potential is applied. It shrinks in volume in the vicinity of the right-hand electrode layer 2 to which a positive potential is applied. Accordingly, the ionically conductive polymer layer 1 bends toward the right hand in FIG. 2C.

The deformation performance (deformation magnitude and/or deformation rate) of the polymer actuator 10 can be controlled by adjusting at least one parameter selected from the specific surface area of carbon particles, the weight ratio in solid content between the carbon particles and the ionically conductive resin, and the thicknesses of the electrode layers 2.

The deformation performance (deformation magnitude and/or deformation rate) of the polymer actuator 10 may also be controlled by adjusting the ratio of the thicknesses of the electrode layers 2 to the thickness of the ionically conductive polymer layer 1.

The polymer actuator 10 may be prepared according to the following procedure including the steps S11 to S16.

S11: An ionically conductive polymer layer 1 is prepared.

S12: A coating composition is prepared by dissolving an ionically conductive resin in an organic solvent and dispersing carbon particles having a predetermined specific surface area so as to yield a target weight ratio in solid content of the carbon particles to the ionically conductive resin.

S13: Membrane electrodes 2 having desired thicknesses are prepared by applying a film of the coating composition prepared in Step S12 to the ionically conductive polymer layer 1 by dipping, drying the applied film in the air, and repeating these procedures (dip coating and drying).

S14: The ionically conductive polymer layer 1 is impregnated with a cationic substance. Specifically, the ionically conductive polymer layer 1 having the electrode layers 2 is immersed in a solution of a chloride or hydroxide containing a metal ion or an organic ion, or in an ionic liquid. Thus, the ionically conductive polymer layer 1 and the electrode layers 2 are impregnated with any of the metal ion, organic ion, and ionic liquid.

S15: The multilayer film prepared in Step S14 is cut at both ends and is then cut into a predetermined shape.

S16: Lead wires 4 are connected to the pair of electrode layers 2, respectively. Thus, a polymer actuator 10 is prepared.

A polymer actuator according to another embodiment will be illustrated below.

FIG. 3 is a schematic cross-sectional view of a polymer actuator according to another embodiment.

As shown in FIG. 3, the polymer actuator 20 has the same configuration as that of the polymer actuator 10, except that electroconductive metallic layers 3 including gold or platinum are arranged over the pair of electrode layers 2, respectively, and that the lead wires 4 are electrically connected to the electroconductive metallic layers 3, respectively. In the polymer actuator 20, the ionically conductive polymer layer 1, the electrode layers 2, and the cationic substance to be impregnated to the ionically conductive polymer layer 1 have the same configurations as those illustrated in the polymer actuator 10.

The electroconductive metallic layers 3 may be thin films of gold or platinum arranged on the pair of electrode layers 2. These films may be formed according to a film-forming technique such as wet plating, vapor deposition or sputtering. The thicknesses of the electroconductive metallic layers 3 are not specifically limited, but are preferably such thicknesses that the electroconductive metallic layers 3 are homogenous, continuous membranes and potentials fed from the lead wires 4 are homogenously applied to the electrode layers 2.

The polymer actuator having the above configuration according to another embodiment may exhibit further excellent deformation performance with further high reliability.

EXAMPLES

Polymer actuators according to embodiments will be illustrated below with reference to several examples below.

Experimental Example 1

A polymer actuator 10 according to an embodiment was prepared according to the following procedure including Steps S21 to S26.

S21: A fluorocarbon-resin ionically conductive polymer layer (the product of E.I. du Pont de Nemours and Company under the trade name of Nafion (N-117)) was prepared as an ionically conductive polymer layer 1. This membrane has a thickness of 127 μm.

S22: A 5 percent by weight Nafion solution was prepared by dissolving Nafion as an ionically conductive resin in an organic solvent containing 50% of pure water and 50% of ethanol. Next, coating compositions were prepared by mixing and dispersing a series of carbon particles having varying BET specific surface areas of 13 to 800 m$^2$/g in the Nafion solution so that the weight ratio in solid content of the carbon particles to the ionically conductive resin (C/B ratio) was 0.5.

S23: The coating composition prepared in Step S22 was applied to the ionically conductive polymer layer 1 by dipping, and the applied film was dried in the air. These procedures including dip coating and drying were repeated and thereby yielded electrode layers 2 each having a thickness of 30 μm. The resulting article was then washed by sequentially immersing the article in a 3 percent by weight hydrogen peroxide aqueous solution at 70° C. for one hour, in pure water at 70° C. for one hour, in a 1 M sulfuric acid at 70° C. for one hour, and in pure water at 70° C. for one hour.

S24: The ionically conductive polymer layer 1 and the electrode layers 2 were impregnated with sodium ion by immersing the ionically conductive polymer layer 1 bearing the electrode layers 2 in a 0.1 N aqueous sodium hydroxide solution for two hours. Next, washing with pure water was carried out to complete this step.

S25: The multilayer film after step S24 was cut at both ends and was cut into strips 2 mm wide.

S26: Lead wires 4 were connected to the pair of electrode layers 2, respectively. A series of polymer actuator 10 was thus prepared.

Each of the prepared samples (polymer actuators) was fixed at one end, and a voltage at +1 V was applied thereto. As a result, the samples with the fixed end as an axial bent toward one of the electrode layers 2 to which a positive potential was applied. The applied voltage was then switched to −1 V, and the samples bent toward the other of the electrode layers 2. The deformation magnitude at a position 15 mm away from the fixed end at the applied voltage of +1 V and that at −1 V were determined using a laser displacement gauge, and the difference between the deformation magnitudes was calculated.

Figure 4:
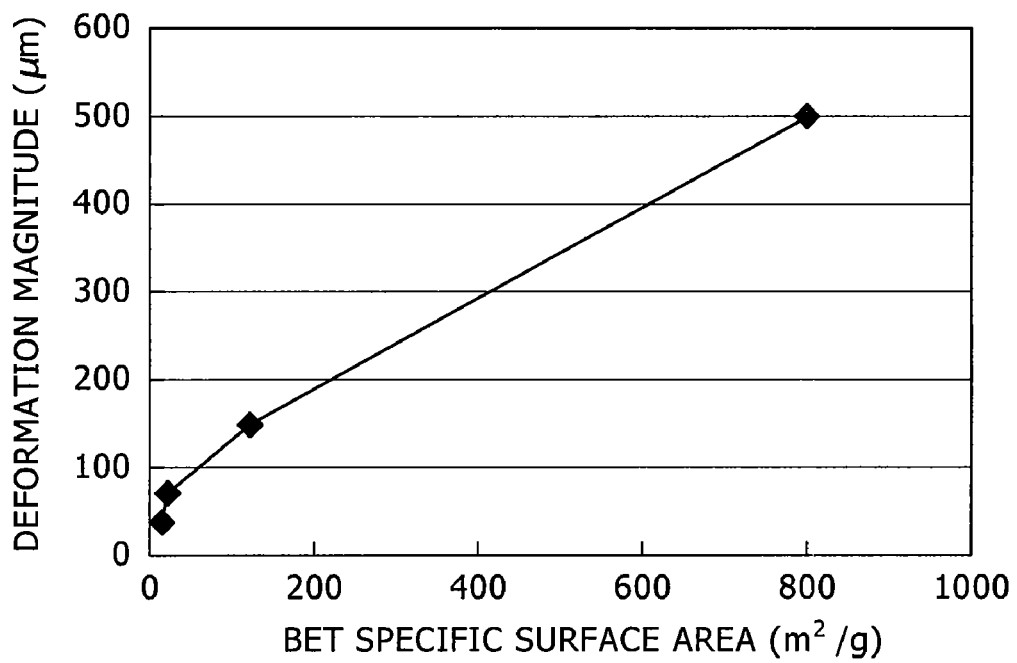
FIG. 4 illustrates the results in Experimental Example 1.

The results are shown in FIG. 4. FIG. 4 demonstrates that the deformation magnitude tends to increase with an increasing Brunauer-Emmett-Teller (BET) specific surface area of carbon particles.

Experimental Example 2

Experimental Example 2-1

A series of samples of the polymer actuator 10 without electroconductive metallic layers was prepared by the procedure of Experimental Example 1, except for using carbon particles having a BET specific surface area of 800 m$^2$/g in the coating composition, and setting the weight ratio in solid content of the carbon particles to the ionically conductive resin (C/B ratio) at 0.25 to 2 in Step 22.

Experimental Example 2-2

A series of samples of the polymer actuator 20 having electroconductive metallic layers was prepared by the procedure of Experimental Example 1, except for using carbon particles having a BET specific surface area of 800 m$^2$/g in the coating composition and setting the weight ratio in solid content of the carbon particles to the ionically conductive resin (C/B ratio) at 0.25 to 2 in Step 22; forming thin films of gold as electroconductive metallic layers 3 on the pair of electrode layers 2 by sputtering after Step S25; and connecting the lead wires 4 to the gold thin films.

Each of the samples prepared according to Experimental Examples 2-1 and 2-2 was fixed at one end, voltages of ±1 V were applied thereto, and the deformation magnitude at a position 15 mm away from the fixed end was determined using a laser displacement gauge.

Figure 5:
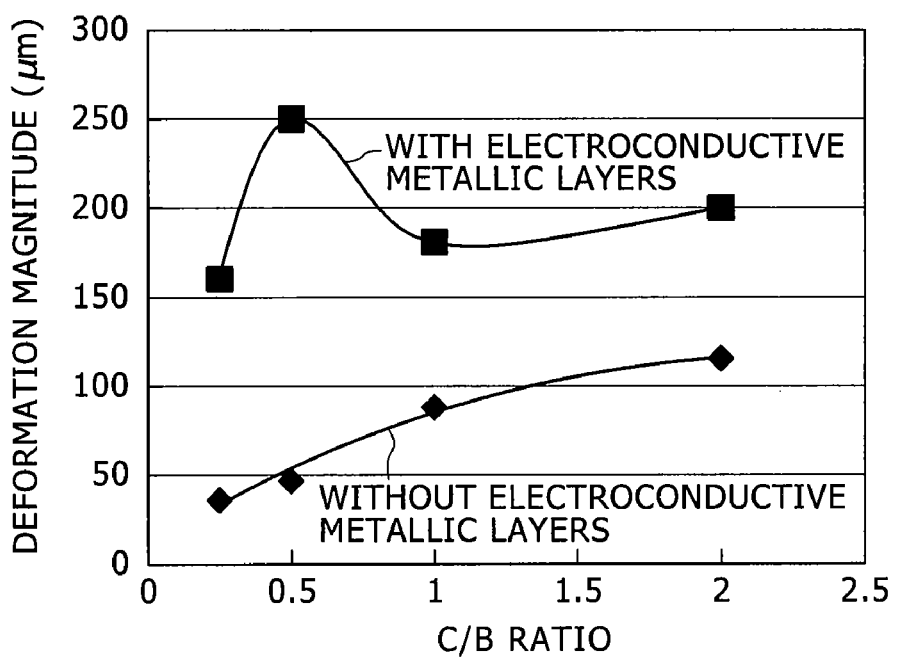
FIG. 5 illustrates the results in Experimental Example 2.

The results are shown in FIG. 5.

Experimental Example 3

A series of samples of the polymer actuator 10 without electroconductive metallic layers was prepared by the procedure of Experimental Example 1, except for using carbon particles having a BET specific surface area of 800 m$^2$/g in the coating composition in Step S22, and setting the thicknesses of the electrode layers 2 at 1.7 to 54 μm in Step S23.

Each of the prepared samples was fixed at one end, and positive and negative potentials were applied to the pair of electrode layers 2, respectively, in alternate order at intervals of 0.1 Hz, and the deformation magnitude at a position 15 mm away from the fixed end was determined using a laser displacement gauge. The above potential application procedure was repeated, except for applying the potentials in alternate order at intervals of 1 Hz, and the deformation magnitude at a position 15 mm away from the fixed end was determined using a laser displacement gauge.

Figure 6:
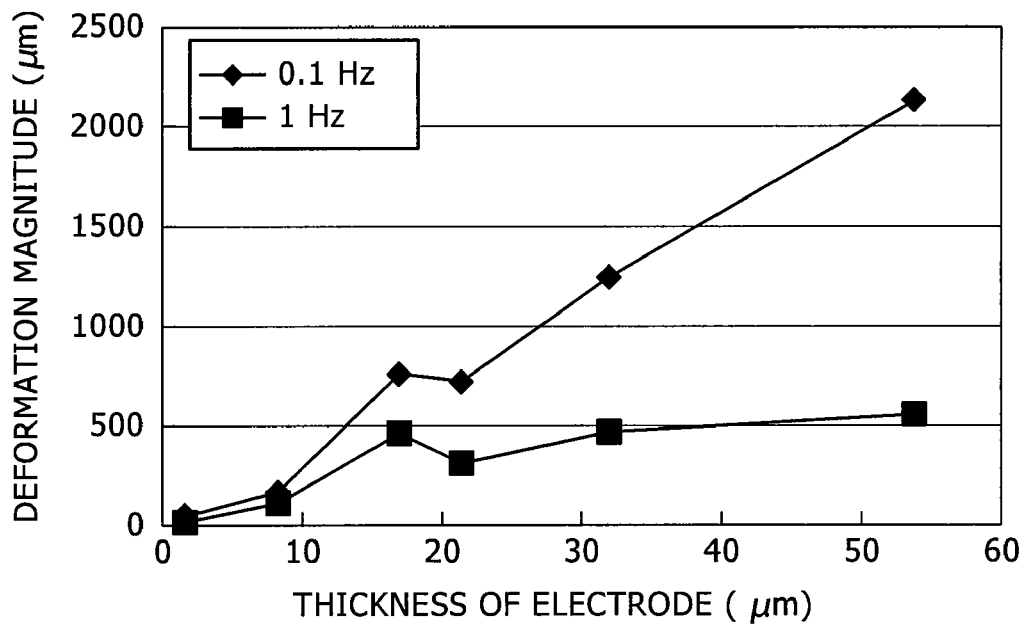
FIG. 6 illustrates the results in Experimental Example 3.

The results are shown in FIG. 6.

Experimental Example 4

A series of samples of the polymer actuator 10 without electroconductive metallic layers was prepared by the procedure of Experimental Example 1, except for using carbon particles having a BET specific surface area of 800 m$^2$/g in the coating composition in Step 22. Another series of samples of the polymer actuator 20 having electroconductive metallic layers was prepared by the procedure of Experimental Example 1, except for using carbon particles having a BET specific surface area of 800 m$^2$/g in the coating composition in Step 22; forming thin films of gold as electroconductive metallic layers 3 on the pair of electrode layers 2 by sputtering after Step S25; and connecting the lead wires 4 to the gold thin films.

Each of the prepared samples was fixed at one end, and positive and negative potentials at a voltage of 2 V were applied to the pair of electrode layers 2, respectively, in alternate order at intervals of 0.1 Hz, and the deformation magnitude at a position 15 mm away from the fixed end was determined using a laser displacement gauge. The potential application procedure was repeated, except for applying the potentials in alternate order at intervals of 1 Hz, and the deformation magnitude at a position 15 mm away from the fixed end was determined using a laser displacement gauge.

Figure 7:
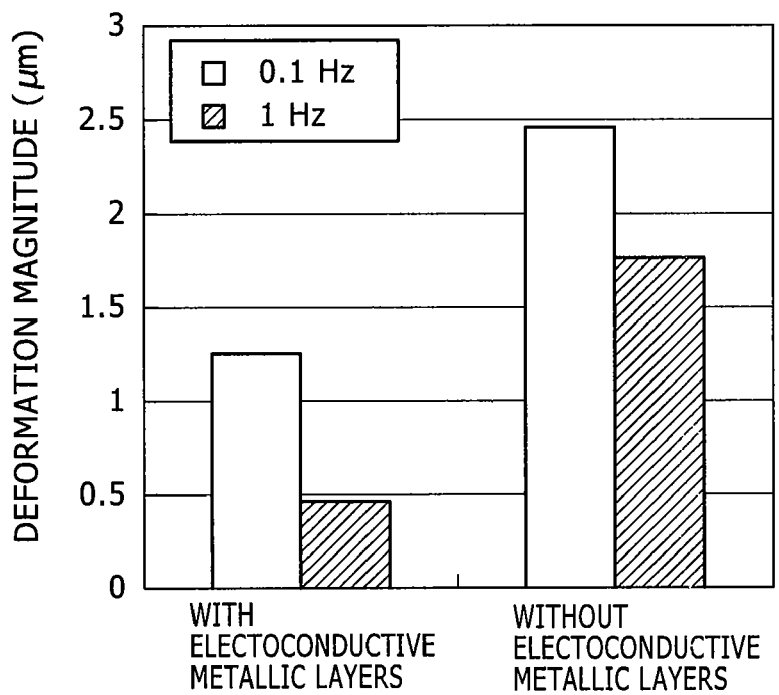
FIG. 7 illustrates the results in Experimental Example 4.

The results are shown in FIG. 7.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A polymer actuator comprising:
    a pair of electrode layers; and
    an ionically conductive polymer layer arranged between the pair of electrode layers,
    the ionically conductive polymer layer being configured to bend or deform as a result of an application of a voltage between the pair of electrode layers;
    wherein the electrode layers each include carbon particles and an ionically conductive resin, and
    wherein the ionically conductive resin binds the carbon particles with each other.

2. The polymer actuator according to claim 1, wherein the polymer actuator has deformation performance controlled by adjusting at least one selected from the group consisting of:
    a specific surface area of the carbon particles;
    a weight ratio in solid content of the carbon particles to the ionically conductive resin; and
    a thicknesses of the electrode layers.

3. The polymer actuator according to claim 1,
    wherein the electrode layers each comprise a film of a coating composition applied to the ionically conductive polymer layer, and
    wherein the coating composition includes:
    an ionically conductive resin component; and
    carbon particles.

4. The polymer actuator according to claim 1,
    wherein the electrode layers are electroconductive films compressed and bonded to the ionically conductive polymer layer, and
    wherein the electroconductive films each include:
    an ionically conductive resin; and
    carbon particles.

5. The polymer actuator according to claim 1, further comprising electroconductive metallic layers arranged on or above the electrode layers respectively.

6. The polymer actuator according to claim 5, wherein the electroconductive metallic layers each comprise at least one of gold and platinum.

7. The polymer actuator according to claim 1, wherein the ionically conductive polymer layer is impregnated with a cationic substance comprising at least one of:
    a metal ion and water;
    an organic ion and water; and
    an ionic liquid.

* * * * *